United States Patent [19]

Klatzer et al.

[11] 4,210,467
[45] Jul. 1, 1980

[54] METHOD OF MAKING A REINFORCEMENT FOR VEHICLE DOORS

[75] Inventors: Stefan Klatzer, Schloss Neuhaus; Winfried Dickhoff, Paderborn, both of Fed. Rep. of Germany

[73] Assignee: Benteler Werke AG, Paderborn, Fed. Rep. of Germany

[21] Appl. No.: 960,593

[22] Filed: Nov. 14, 1978

[30] Foreign Application Priority Data

Nov. 14, 1977 [DE] Fed. Rep. of Germany ....... 2750867

[51] Int. Cl.² ........................... C21D 9/08; C21D 7/14
[52] U.S. Cl. .................................................. 148/12 R
[58] Field of Search ................ 148/12 R, 12 B, 12 F, 148/36; 75/126 B, 126 C

[56] References Cited

U.S. PATENT DOCUMENTS

| 3,328,988 | 7/1967 | Schmidt | 148/12 R |
| 3,573,999 | 4/1971 | Gokyu | 148/12 B |

Primary Examiner—L. Dewayne Rutledge
Assistant Examiner—Peter K. Skiff
Attorney, Agent, or Firm—Michael J. Striker

[57] ABSTRACT

A tubular reinforcing element for the interior of vehicle doors is made from a steel tube having a carbon content of 0.14–0.18%, 0.15–0.30% silicon, 1.60–1.80% manganese, 1.90–2.10% chromium, 0.45–0.60% molybdenum and at least 0.015% aluminum. This tube is annealed at 900°–930° C. and then aircooled. Thereafter the portions of the tube which are to be deformed are heated to above the temperature of the alpha-gamma phase change (A₃ on the iron-carbon equilibrium diagram), then deformed to the desired shape and aircooled. All percentages are by weight.

8 Claims, 1 Drawing Figure

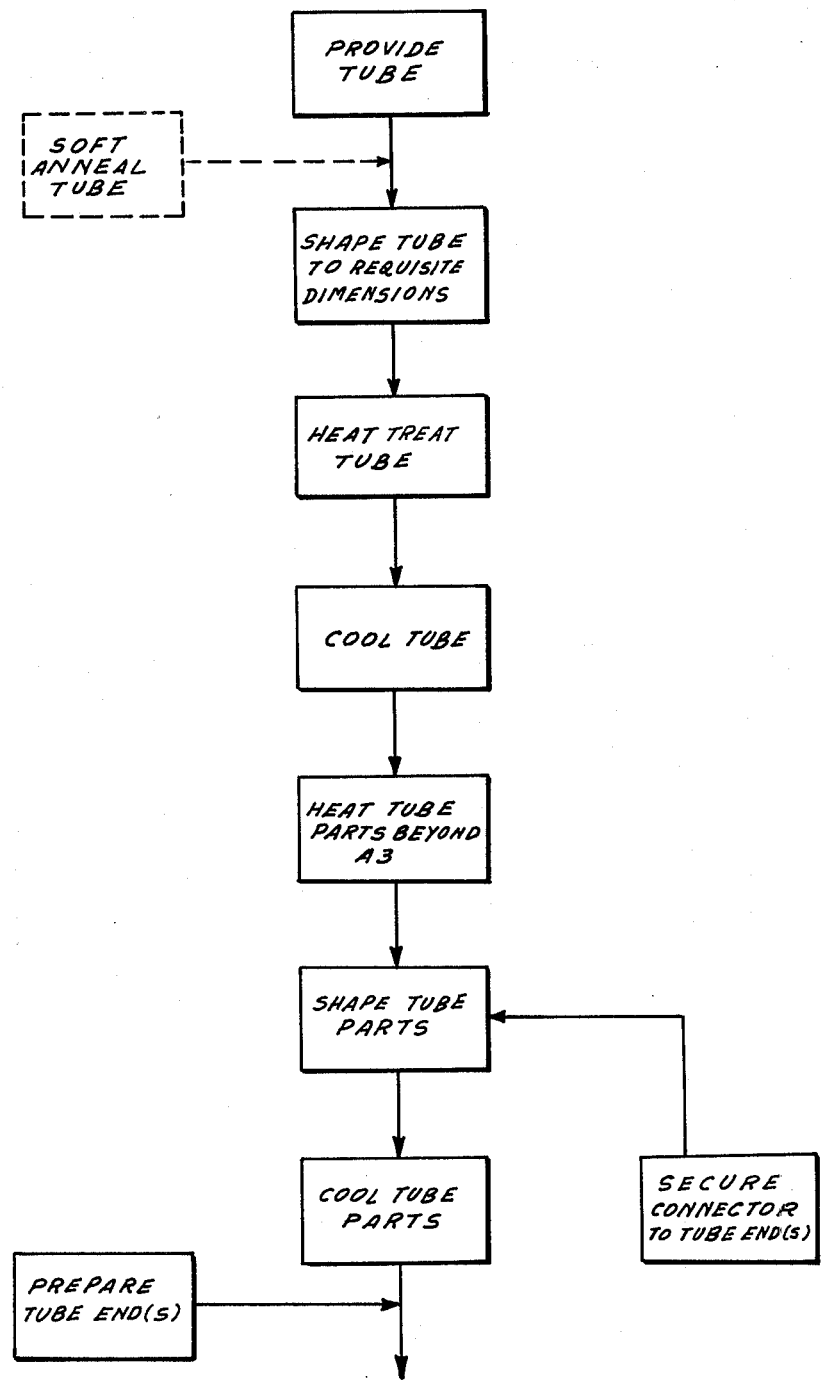

METHOD OF MAKING A REINFORCEMENT FOR VEHICLE DOORS

BACKGROUND OF THE INVENTION

1. Field of the Invention

The present invention relates to a method of making tubular-steel reinforcements.

More particularly, the invention relates to a method of producing tubular-steel reinforcements for the interior of vehicle doors, especially the doors of automotive vehicles.

2. The Prior Art

The doors of automotive vehicles are essentially composed of an outer sheet-metal shell and an inner sheet-metal panel. In some cases the inner panel may be of synthetic plastic material or of another non-metallic material. In all instances, however, the outer shell and the inner panel bound between themselves a hollow space which is generally empty except for the window lift mechanism.

Since these doors do not offer much protection to persons in the vehicle, e.g., in the event of an accident, it is now widely customary—and in some countries required by law—to mount in the space between the outer shell and the inner panel a horizontally extending reinforcing member (also called an anti-intrusion member). If the inner panel is of metal, this reinforcing member may be welded to that side of the panel which faces the interior space of the door. In order not to contradict the efforts to make vehicles lighter and thus reduce fuel consumption, the reinforcing member is usually of tubular configuration rather than being a beam of solid cross-section. Of course, to offer adequate protection the reinforcing elements must meet certain minimum mechanical requirements which in some countries are regulated by law.

These minimum requirements are determined by the tensile strength $\sigma_B$ of the tubular reinforcing element, its limit of stretch $\sigma_S$, its break elongation $\delta_5$ and the deformation load. The deformation load is defined as the load expressed in kgm, which is required to produce a permanent bowing of the tubular reinforcing element (i.e., deflection of the originally straight element) of about 150 mm under conditions in which the ends of the element are loosely supported and the load is applied to the element in transverse direction at a point located substantially midway between the supports. The rule is that a tubular reinforcing element (installed in a vehicle door) can be expected to offer adequate protection against lateral impact on the door if its tensile strength $\sigma_B$ amounts to between 110–140 kg/mm², its limit of stretch $\sigma_S$ to between 80–110 kg/mm², its break elongation $\delta_5$ is at least 13% and the deformation load is at least 240 kgm.

These acceptable values can be attained by making the tubular reinforcing elements from titanium-alloyed steel or from steel of the type St 52-3 as defined in DIN (German Industrial Standard) 17100. However, the use of these steel types requires a large number of process steps in connection with the preparation and shaping of the steel tubes. This is extremely time-consuming and expensive and is, therefore, highly undesirable from an economic point of view.

SUMMARY OF THE INVENTION

Accordingly, it is an object of the invention to overcome the disadvantages of the prior art.

More particularly, it is an object of the present invention to provide an improved method of making an anti-intrusion member for vehicle doors.

Still more particularly, it is an object of the invention to provide such an improved method which results in the production of an anti-intrusion member meeting all of the above-outlined requirements, but which method is much simpler—and therefore more economical—than those known from the prior art.

Pursuant to the above objects, and still others which will become apparent hereafter, one aspect of the invention resides in a novel method of making a tubular reinforcing element for the interior of vehicle doors. Briefly stated, the method may comprise the steps of providing a tubular element composed of steel containing 0.14 to 0.18% by weight of carbon, 0.15 to 0.30% by weight of silicon, 1.60 to 1.80% by weight of manganese, 1.90 to 2.10% by weight of chromium 0.45 to 0.60% by weight of molybdenum and at least 0.015% by weight of aluminum; annealing the tubular element to a temperature of between 900° and 930° C. and thereupon cooling it; heating portions of the tubular element to a temperature above the point $A_3$ of the iron-carbon equilibrium diagram; deforming the thus heated portions to impart to them the desired shape; and cooling the tubular element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a flow diagram showing the steps performed according to the invention.

DESCRIPTION OF THE PREFERRED EMBODIMENTS

The inventive method and the steps performed in carrying it out will now be described with reference to the flow diagram in the drawing FIGURE.

The first step is to provide a steel tube; the manner in which such a tube (which is preferably seamless but may also be of the type having a longitudinally extending welded seam) is manufactured is known per se and forms no part of the invention.

However, it is a part of the invention that the new process must begin with a tube the steel of which includes between 0.14–0.18% by weight of carbon, between 0.15–0.30% by weight of silicon, between 1.60–1.80% by weight of manganese, between 1.90 and 2.10% by weight of chromium, between 0.45–0.60% by weight of molybdenum and at least 0.015% by weight of aluminum.

This tube is shaped in the conventional manner (e.g., by drawing dies) to the requisite dimensions, i.e., the desired internal and external diameter. If desired, the tube may be soft annealed (as shown in the FIGURE) at a temperature of about 660° C. to 690° C., and only thereafter be shaped to its desired dimensions by cold-drawing (known per se).

After the shaping the tube is subjected to a further annealing step (preferably in the presence of an inert protective gas, such as argon) at a temperature of about 900°–930° C. and is then aircooled (by e.g., an airblast) to about 720° C. Thereafter, those parts of the tube which are to be deformed (e.g., to make them more readily connectable to other elements in the door) are heated to a temperature of about 1150° C. corresponding to the point E on the iron-carbon equilibrium diagram (i.e., beyond the point $A_3$ at which the alpha-gamma phase change takes place). At the temperature of point $A_3$ (910° C.) the last of the proeutectoid ferrite of the hypoeutectoid steel has been absorbed into the austenite. In the heated condition the requisite parts of the tube (usually the end portions or at least one of them) are shaped by e.g., pressing them to a desired configuration (such as flat, elliptical or any other required shape) and are thereupon aircooled.

It has been found that a tubular element produced according to the invention, from a steel having the above listed composition, will meet all the earlier-mentioned requirements as to tensile strength $\sigma_B$, stretch limit $\sigma_S$, break elongation $\delta_5$ and deformation load; which is to say that such a tubular element will have the desired characteristics within the ranges which have been given for them earlier herein. These characteristics are obtained, with the method according to the invention, for all parts of the tubular element.

A particular advantage of the method according to the invention, as compared to analogous methods which use titanium-alloyed steels or type ST 52-3 steel, is that the present method makes it possible to obtain the desired values for tensile strength, stretch limit, break elongation and deformation load, without having to resort to the subsequent time-consuming heat treatments (including quenching in baths, etc.) which are an indispensable part of the prior-art methods. Also, resorting to the present invention eliminates the need for subsequent shaping and/or straightening operations.

Using a seamless tube as the starting material the desired values for tensile strength, stretch limit, break elongation and deformation load are most reliably obtained. However, seamless tubes are more expensive to produce than seamed tubes. Therefore, in the interests of achieving further economy and in view of the fact that the type of steel to be used (the composition has already been explained) is weldable, the method according to the invention may also be practiced with tubes of this steel which have a longitudinally extending welded seam.

The shaping step subsequent to the important step of heating beyond the point $A_3$, usually involves a pressing operation in which one or both end portions of the tubular element are pressed to a desired cross-sectional configuration. After final cooling the pressed portions can then be subjected (see the FIGURE) to a further step (e.g., drilling or milling) which prepares them for securement to a connecting element by means of which the tubular element is to be mounted in the vehicle door.

Another possibility is to non-releasably secure at least one of the ends of the tubular element to a connector, e.g., to a receiver which itself will later be suitably secured to the vehicle door (see the FIGURE). If so, this can be done as part of the hot-shaping step which follows the step of heating beyond the point $A_3$, by pressing the hot end portion or end portions into recesses provided for this purpose in the connector. To achieve a non-releasable connection, portions or areas of the respective end portion may be pressed (in a spot-shaped or a line-shaped pattern) into corresponding depressions of the connector to obtain a mechanical locking effect.

While the invention has been illustrated and described as embodied in a method of making an anti-intrusion member for vehicle doors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of making a tubular reinforcing element, particularly for vehicle doors, comprising the steps of providing a tubular element composed of steel containing 0.14 to 0.18% by weight of carbon, 0.15 to 0.30% by weight of silicon, 1.60 to 1.80% by weight of manganese, 1.90 to 2.10% by weight of chromium, 0.45 to 0.60% by weight of molybdenum and at least 0.015% by weight of aluminum; annealing the tubular element at a temperature of between 900° to 930° C. and thereupon cooling it; heating portions of the tubular element to a temperature above the point $A_3$ of the iron-carbon equilibrium diagram; deforming the thus heated portions to impart to them the desired shape; and cooling the tubular element.

2. A method as defined in claim 1, wherein both of the steps of cooling are carried out by air-cooling the tubular element.

3. A method as defined in claim 1, wherein the tubular element provided is a hot-rolled seamless tube.

4. A method as defined in claim 1, wherein the tubular element is a soft-annealed tube which is cold-drawn to the desired diameter.

5. A method as defined in claim 1, wherein the tubular element is a tube which was soft-annealed at between 660° and 690° C. and thereafter cold-drawn to the desired diameter.

6. A method as defined in claim 1, wherein the tubular element is a longitudinally welded and dimensionally calibrated tube.

7. A method as defined in claim 1, wherein the step of deforming comprises press-shaping at least one end portion of said tube, for later material-removing treatment of the press-shaped end portion in preparation for its securement to a connecting member.

8. A method as defined in claim 1, wherein the step of deforming comprises press-fitting at least one end portion of said tube into a recess of a connecting member so as to non-releasably connect the end portion thereto.

* * * * *